United States Patent [19]
Haseltine et al.

[11] Patent Number: 6,108,142
[45] Date of Patent: Aug. 22, 2000

[54] SYSTEM FOR DISPLAYING A PHOSPHORESCENT IMAGE AND METHOD THEREFOR

[75] Inventors: Eric C. Haseltine, Manhattan Beach; Kathleen L. Nelson, Pasadena, both of Calif.

[73] Assignee: Disney Enterprises, Inc., Burbank, Calif.

[21] Appl. No.: 09/185,846

[22] Filed: Nov. 4, 1998

[51] Int. Cl.$^7$ ........................................ G02B 3/00
[52] U.S. Cl. .................................................. 359/809
[58] Field of Search .................... 359/618, 809, 359/810, 811, 819, 801, 804; 313/473, 461; 356/951

[56] References Cited

U.S. PATENT DOCUMENTS

| | | |
|---|---|---|
| 2,877,371 | 3/1959 | Orthuber et al. ................. 313/108 |
| 2,882,413 | 4/1959 | Vingerhoets ........................ 250/80 |
| 2,909,692 | 10/1959 | Cusano ............................. 313/108 |
| 3,573,457 | 4/1971 | Grant et al. ......................... 250/71 |
| 3,683,336 | 8/1972 | Brownlee et al. ................ 340/173 |
| 3,721,849 | 3/1973 | Gallaro ................................ 313/92 |
| 3,785,720 | 1/1974 | Kyryluk ............................. 350/144 |
| 4,186,413 | 1/1980 | Mortimer .......................... 358/146 |
| 4,547,672 | 10/1985 | Arakawa et al. ................. 250/483.1 |
| 4,559,556 | 12/1985 | Wilkins ............................... 358/88 |
| 4,692,118 | 9/1987 | Mould ............................... 434/236 |
| 4,734,037 | 3/1988 | McClure ........................... 434/236 |
| 4,800,136 | 1/1989 | Arakawa et al. ................. 428/690 |
| 5,017,143 | 5/1991 | Backus et al. .................... 434/236 |
| 5,036,208 | 7/1991 | Murata et al. .................. 250/487.1 |
| 5,244,750 | 9/1993 | Reilly et al. ...................... 428/690 |
| 5,270,800 | 12/1993 | Sweet ................................ 348/589 |
| 5,382,233 | 1/1995 | Brotz .................................. 434/88 |
| 5,418,377 | 5/1995 | Tran et al. ......................... 250/483 |

Primary Examiner—Ricky Mack
Attorney, Agent, or Firm—Pretty, Schroeder & Poplawski

[57] ABSTRACT

A special effect system and method includes an image panel having a surface coated with phosphor particles and a video screen that projects a transmitted predetermined display. The phosphor coated surface of the image panel is placed in close proximity to the video screen. The phosphor particles that overlap and are thus exposed to the predetermined display are excited by the wavelength emissions of the display and undergo phosphorescence in a wavelength range of human-visible light. Thus, when the panel is removed from the screen, a glow in the dark, "secret" message or image, special effect is revealed.

24 Claims, 3 Drawing Sheets

SYSTEM FOR DISPLAYING A PHOSPHORESCENT IMAGE AND METHOD THEREFOR

FIELD OF THE INVENTION

This invention relates to video entertainment systems and more particularly to devices responsive to the radiation of images from video screens.

BACKGROUND OF THE INVENTION

Many forms of "electronic entertainment" that use video screens, such as a multitude of video and computer games and home video have proliferated in the home. As a result, television broadcasters and entertainment content providers, for example, have been faced with the challenge of enhancing the appeal of television and other programming in order to stay competitive with these alternative forms of home entertainment. One solution is to introduce special effects to a viewable program together with a degree of interactivity between the program and the viewer. A primary challenge for broadcasters and other content providers is to deliver this increased entertainment value at a very low cost to the consumer.

Numerous schemes for introducing new effects to, and/or enhancing the visual content of, television or other image media have been suggested, including three-dimensional viewing of a two-dimensional display, the broadcast of subliminal messages, and using a television screen as a method of art instruction. However, none of these effects provide for low-cost and interactive video entertainment for children. Thus, a need exists for a low cost, special effects system and method for playing interactively with television broadcasts or other video transmission media in order to increase the entertainment value of these transmissions.

SUMMARY OF THE INVENTION

The present invention fulfills this need by providing a low cost, "glow-in-the-dark" special effect system and method that displays an image of a predetermined display or message that is electronically transmitted to, and emitted from, a video, or television, screen. The special effect is an image panel comprising a substantially transparent, thin, flexible sheet and phosphor particles disposed across the sheet. The video screen projects the predetermined display and emits radiation within a wavelength range in the area of the screen transmitting the display. The panel is then placed in close proximity to the video screen in overlapping relation to the display. Those phosphor particles exposed to the radiation within the predetermined wavelength range then undergo phosphorescence in a wavelength range that is visible to the human eye, thus creating a visible light-emitting image of the display on the panel.

The advantages of a such a system are numerous. First, phosphor-coated panels can be very inexpensively manufactured, particularly in high volume. Further all that is needed to "activate" the image panel is the common color television set or any other monitor capable of transmitting a predetermined display. Today, these items are found in most homes in the U.S. and in many other industrialized countries. Third, the system, or game, is simple enough for even very young children to operate and enjoy. Finally, the system is capable of producing an image of artwork or a message of any shape and of any size up to the size of the video transmission area of the video screen.

The phosphors used in the panel have a time decay characteristic such that the image created on the panel fades to a non-visible condition within a predetermined time after the panel is removed from proximity to the screen. In this way, the panel may be reused to reproduce and display a different image that may later be displayed on and radiated from, the video screen.

The present invention operates with a video monitor capable of emitting a range of wavelength radiations. In one embodiment, the excitation display emitted from the screen is in a wavelength range that is visible to the eye. In this way, the phosphorescent image created on the panel is a mirror image of the emitted display. In another embodiment, the excitation display emitted from the screen is in a wavelength range that is invisible to the eye, thus creating an effect whereby an image appears from nothing. In yet another embodiment, the emitted radiation defining the predetermined display corresponds to a visible color and regions of the video screen outside the predetermined display radiate wavelengths outside of the predetermined wavelength range corresponding to different colors, thereby making it difficult to visibly separate the predetermined display from the remainder of the video screen.

In order to provide a sharper image of the display, several additional features may be included. In one detailed embodiment of the present invention, an objective lens is disposed between the video screen and the image panel, and is spaced at a predetermined distance from the screen. This effectively focuses the emitted radiation from the predetermined display upon the phosphor particles exposed to the radiation. As a further image-enhancing feature, a light baffle that houses the lens may be disposed between the video screen and the image panel in order to reduce the exposure of the image panel to extraneous light. A further feature for improving the sharpness of the image displayed on the panel is the provision of a curved image panel that substantially matches the curved focal plane created by the objective lens.

The image panel may also include phosphors having different emission characteristics. In one particular embodiment, the phosphor particles comprise more than one phosphor group, each group having a different but visible emission wavelength when exposed to the emitted radiation to create a multi-colored, light-emitting image of the display on the panel.

Instead of using the video screen to radiate predetermined wavelengths in selected areas to correspond to the image to be displayed on a uniformly phosphor-covered image panel, the present invention may operate in a reverse fashion. In such embodiment, the video screen transmits a uniform illumination field and the image panel is selectively coated with phosphor particles in a predetermined image pattern which are excited when placed in close proximity to the video screen. In the former embodiments, a single panel may be used to display an infinite number of images corresponding to the radiated displays from the screen. In this latter embodiment, however, since each panel is prepared in a particular phosphor pattern, only a single image can be displayed per panel. These two embodiments may also be combined to create an image or images on a panel that are partially formed from the video transmission and partially formed from pre-arrangement of the phosphor particles on the image panel.

DETAILED DESCRIPTION OF THE PREFERRED EMBODIMENTS

The invention summarized above and defined by the enumerated claims may be better understood by referring to the following detailed description, which should be read in conjunction with the accompanying drawings. This detailed description of particular preferred embodiments, set out below to enable one to build and use particular implementations of the invention, is not intended to limit the enumerated claims, but to serve as particular examples thereof. The particular examples set out below are the preferred specific implementations of a special effect, phosphorescent imaging panel. namely, a phosphor coated panel that, when placed against a video screen such as a television that radiates at predetermined wavelengths, glows for a period of time to create an image, such as messages or figures. The invention, however, may also be applied to other types of systems and equipment as well.

Figure 1:
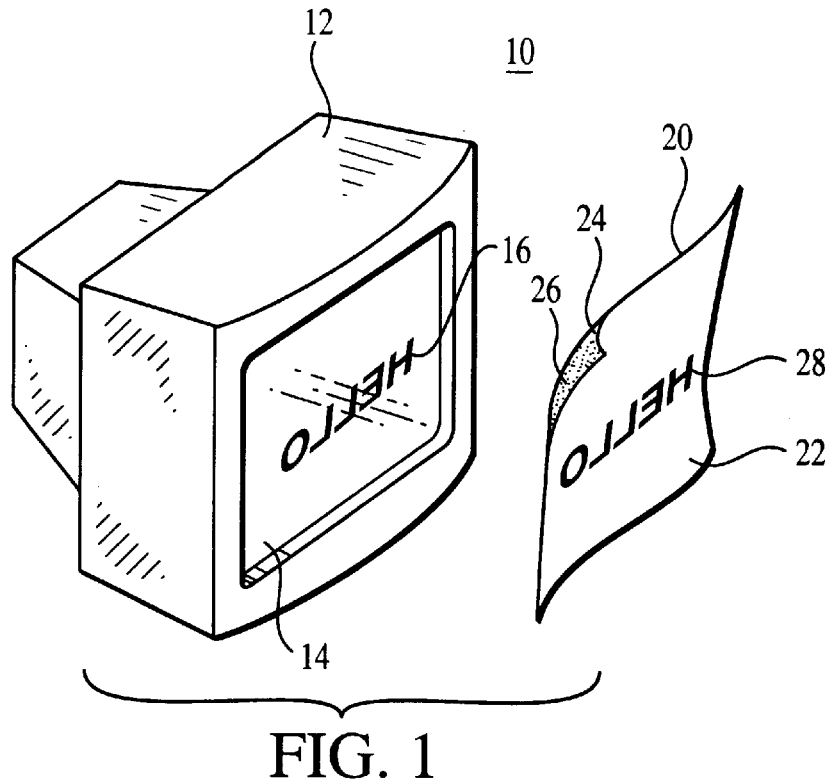
FIG. 1 illustrates the basic concept of the imaging system of the present invention, wherein a phosphor-coated panel reproduces an image displayed on a video screen.

FIG. 1 illustrates the basic components of the present invention. The imaging system 10 includes a color video monitor 12 having a video screen 14 and an image panel 20. It should be understood that the monitor 12 is any conventional device capable of electronically transmitting a predetermined display, typically in the human-visible wavelength range, onto its video screen, such as a television monitor or computer monitor. The predetermined display may be supplied by a signal source external to the location of the monitor (i.e. outside the home), as in the case of FM, cable or satellite broadcast television or Internet video transmission. Alternatively, the display may be generated by non-broadcast sources, such as a video cassette played on a VCR machine or a software program stored on a disk, CD-ROM or other memory devices played on a PC or dedicated computer-based hardware. Yet another option is to create a computer game that permits the player to create the predetermined display via keyboard entry (e.g., for a secret message) or via a graphics/drawing program. As seen in FIG. 1, the predetermined display emitted from the video screen 14 is a message 16, namely, the mirror image of the word "HELLO."

The image panel 20 comprises a substantially transparent, relatively thin, flexible sheet 22 having a front surface 24 upon which a layer of phosphor particles 26 is placed. The layer of phosphor particles 26 is formed on the surface either as a coating or by dispersing the phosphors in a transparent resin matrix. Preferably, suitable phosphors must have an excitation spectrum in the 380–650 nanometer region and an emission spectral peak in the 450–780 nanometer region. Phosphors with these properties include, but are not limited to, zinc sulfide activated by copper, silver, aluminum or mixtures of bismuth, manganese, zinc, calcium or strontium sulfides. The phosphors may also be complex metal oxides. The preferred phosphor particles have a relatively short excitation time in the range of five to fifteen seconds, and a relatively long emission time on the order of minutes to several hours.

The phosphorescent coating may be prepared by dispersing, ideally stirring, the phosphor particles in a transparent, preferably colorless coating. The phosphors should not be ground or milled. Further the coating should be solvent-based. The clear coating should contain enough resin to provide a viscosity high enough to support a 20–50% phosphor loading.

Turning now to a description of the basic method of using the invention, the video monitor 12 is turned on to transmit and project a video picture at the screen 14. The picture includes a predetermined display 16 which emits radiation within a predetermined wavelength range, which is in the excitation wavelength range of the phosphor particles 26. The phosphor coated side of the image panel is then placed in close proximity to, or pressed against, the video screen in overlapping relation to the predetermined display 16. After about five to fifteen seconds, those phosphor particles on the image panel that overlap and are directly exposed to the radiation in the excitation wavelength range undergo phosphorescence in a wavelength range of human-visible light. When the panel is removed from the screen, a "glow-in-the-dark," mirror image 28 of the predetermined display 16, having a color shift to a lower energy/longer wavelength, remains on the panel for a given period of time. FIG. 1 shows a specific example of a predetermined display 16 which comprises the mirror image of the message "HELLO." After the coated side 24 of the panel 20 is pressed against the video screen 14 and then removed, a phosphorescent image 28 of the predetermined display is now generated and captured on the panel. All other areas on the image panel 20, where the emitted light from the video screen falls outside of the excitation wavelength range of the phosphor particles 26, remain dark.

The brightest image will be generated when shielding the image panel from all ultraviolet and visible radiation for a period of time equal to the total emission time of the phosphors (which may range from several seconds to several hours). Further, the image is best viewed in a dark room.

Figure 2:
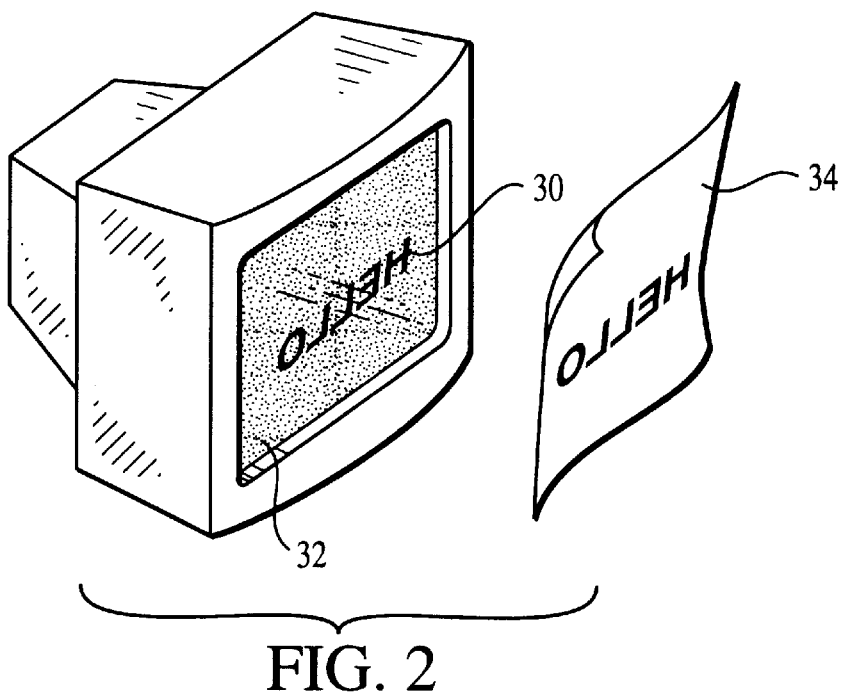
FIG. 2 is an alternative embodiment of the system shown in FIG. 1 wherein the video screen transmits a message which is masked by colors having wavelength characteristics to which the image panel is insensitive.

FIG. 2 shows an alternative embodiment or enhancement to the basic design shown in FIG. 1. In particular, the predetermined display 30, here again shown as a reverse "HELLO" message, is transmitted in one color, for example blue. The remainder of the video screen 32 transmits a variety of other colors, thereby creating a garbled full color screen. In this way, the predetermined display will not be perceptible to a person with normal color vision when viewing the screen. However, this "hidden message" may be deciphered by placing the image panel 34, whose phosphors are activated only by the blue light of the predetermined display, against the screen. That is, only those areas of the panel that are placed in close proximity to the blue wavelength light absorb the light and reemit phosphorescent light at another wavelength, for example green light. While the areas on the screen 30 surrounding the blue wavelength excitation areas transmit in red, green or yellow, the corresponding areas on the panel remain unexcited and unlit.

Figure 3:
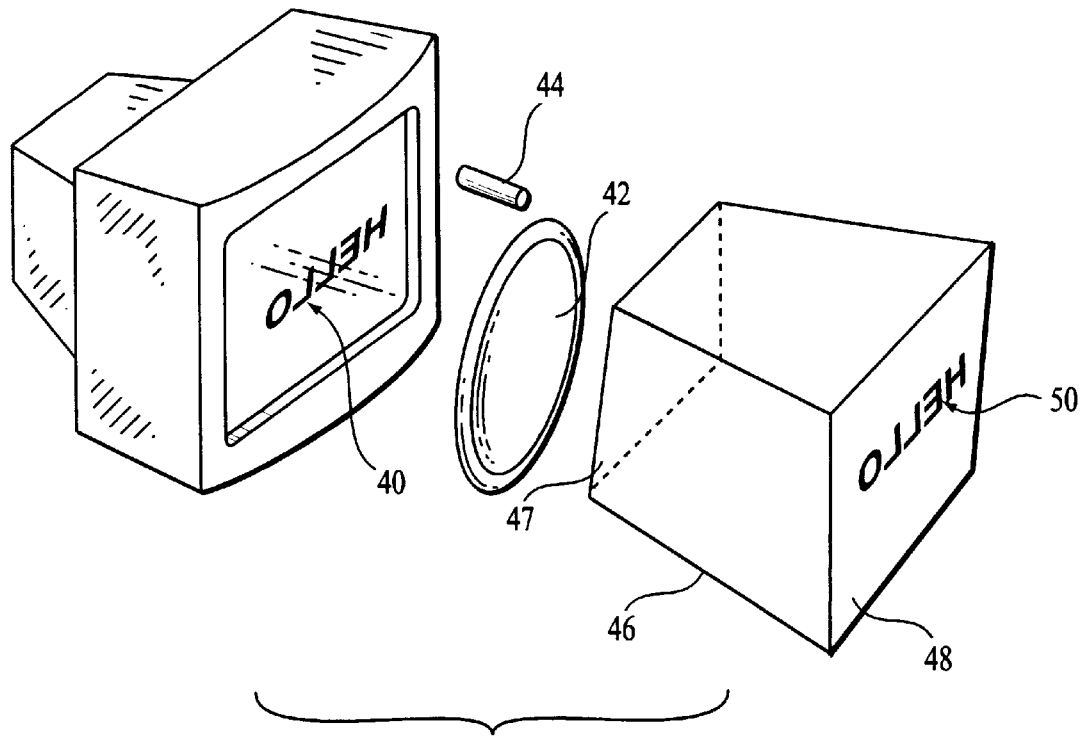
FIG. 3 illustrates an alternative embodiment of the system shown in FIG. 1, wherein an objective lens and several other components are added to improve the appearance of the image on the image panel.

One limitation of the above technique is that the images developed on the image panel can be blurred due to the spreading of the excitation light through the thickness of the video screen glass prior to reaching the phosphors on the surface ol the image panel. Accordingly, several steps may be taken to improve the image quality on the image panel. As seen in FIG. 3, the predetermined display 40 can be brought into sharp focus on the phosphor panel 50 via an objective lens 42 disposed therebetween. In the preferred embodiment, the objective lens is a simple plastic Fresnel lens that can be manufactured in high volume at a low cost. Other acceptable objective lenses include an injection molded positive meniscus lens, a positive Fresnel mirror, a concave mirror, or other lenses known in the art. To further enhance image quality, FIG. 3 features a light baffle 46 having a entrance aperture 47 for placing against the video screen 40 of the monitor and an opposite aperture 48 which holds the image panel 50 in place. This prevents extraneous room light from partially exciting and exposing the phosphor particles on the panel, which would thereby degrade the magic image effect. The baffle 46 may also house the objective lens 42 and hold it in place. A spacer 44 is also included to properly position the lens at a distance from the video screen that will cause the predetermined display 40 to best focus on the phosphors, thereby creating a sharp phosphorescent image of the message "HELLO" on the image panel 50.

Figure 4:
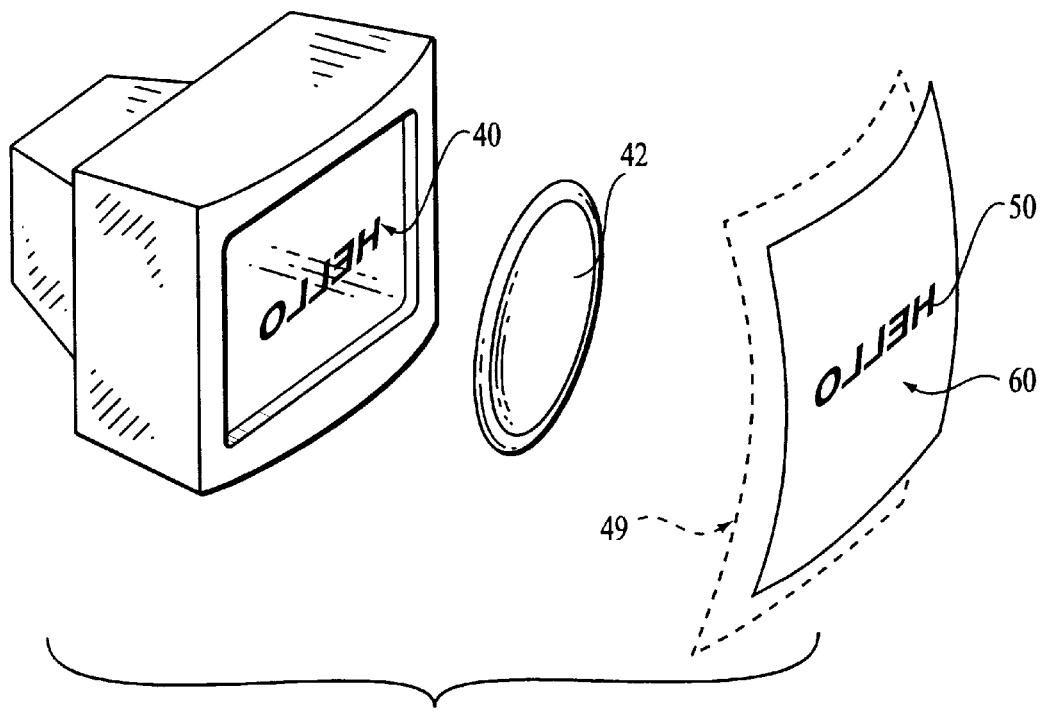
FIG. 4 illustrates another image improving embodiment of the present invention wherein an objective lens is disposed between the video screen and the image panel, wherein the panel has a curved surface to match the curvature field of the objective lens.

FIG. 4 shows how the image 50 can be even further improved by providing a curved surface image panel 60 shaped to match the field curvature 49 of the objective lens 42. Since the objective lens transmits the image of the predetermined display 40 at a focal plane that is curved, the curved surface of the panel compensates for this field curvature to provide a sharper and less distorted image than would be the case without such curving.

Figure 5:
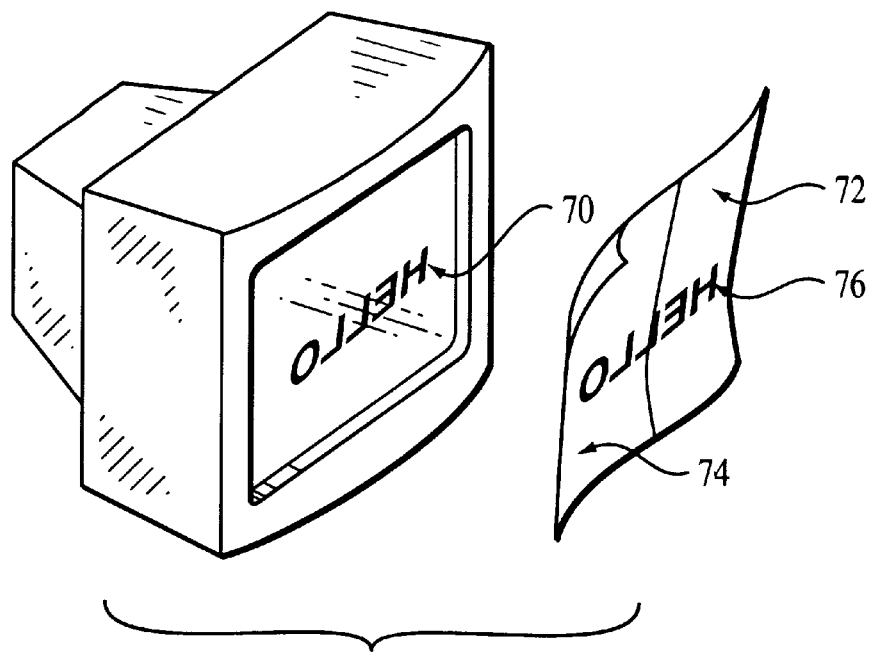
FIG. 5 illustrates an alternative embodiment of the image panel of the present invention, wherein the left portion is coated with a phosphor that emits one color when excited and the right portion is coated with a phosphor that emits another color when excited.

In an alternative embodiment, the special effect panel may be coated with a plurality of phosphor particles, each having a different emission wavelength (color), in order to display a multicolored image. FIG. 5 shows one such basic arrangement in which the entire left portion 72 of the image panel (when viewing from the phosphor coated surface) is coated with a phosphor that emits one color, such as green, when excited and the right portion 74 is coated with a phosphor that emits another color, such as orange, when excited with the same light. In this example, when the predetermined display 70, namely the reverse "HELLO," radiating from the video screen excites the image panel, the areas in the left portion 72 exposed to the display will glow in green, creating a green "H" and "E" image, and the areas in the right portion 74 of the panel will glow in orange, creating an orange "L" "L" and "O" image.

Figure 6:
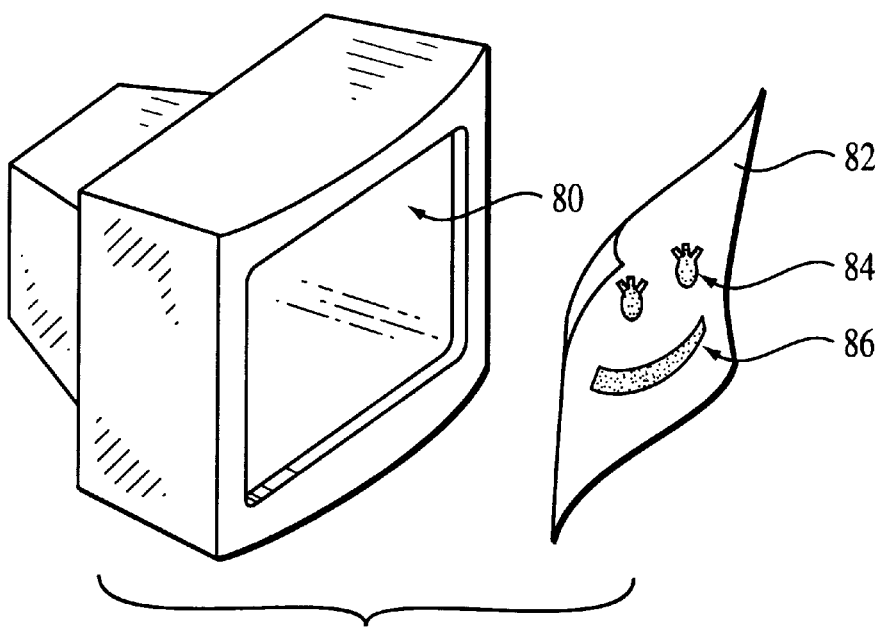
FIG. 6 illustrates yet another alternative to the image panel, wherein phosphors having different emission characteristics are selectively placed on the image panel to create a multi-colored and patterned image when excited.

In yet another embodiment, the phosphor particles are placed on the surface of the image panel in a particular pattern to either reproduce a multi-colored image of a predetermined display transmitted from the video monitor, or to create an image from a uniform illumination field from the monitor. The latter is shown in FIG. 6, wherein the displayed image 80 is apparently a blank screen but is actually transmitting a uniform excitation field which excites the phosphor particles that are patterned on the image panel 82. In this example, one group of the phosphor particles 84 emit green-colored patterns that appear as a pair of eyes, while a second group of phosphor particles 86 emit an orange-colored pattern that appears as a smile.

Having thus described exemplary embodiments of the invention, it will be apparent that further alterations, modifications, and improvements will also occur to those skilled in the art. Further, it will be apparent that the present invention is not limited to use with an image panel that is dedicated solely for as a special effect. The panel may also be designed in the form of a wrapper or form part of a box that contains retail items. Alternatively, the phosphors particles may be cast, extruded or molded in a clear resin matrix to form a toy or other novelty item containing a flat or curved surface to receive the predetermined display. Suitable resins are acrylics, polyesters, epoxies, poly(vinyl)chlorides, polystyrene, and polyethylene. Such alterations, modifications, and improvements, though not expressly described or mentioned above, are nonetheless intended and implied to be within the spirit and scope of the invention. Accordingly, the foregoing discussion is intended to be illustrative only; the invention is limited and defined only by the various following claims and equivalents thereto.

We claim:

1. A system for displaying an image of an electronically transmitted display, comprising:

a video screen for projecting the display which emits radiation within a wavelength range in the area of the screen transmitting the display; and an image panel removably placed in close proximity to said video screen in overlapping relation to the display thereon, said image panel including, a substantially transparent, flexible sheet and phosphor particles disposed uniformly across said sheet, said particles undergoing phosphorescence in a wavelength range of human-visible light when exposed to the radiation within the wavelength range from said video screen, said image panel being removed from the close proximity to said video screen after having been exposed to the emitted radiation to create a visible, light-emitting image of the display on said panel.

2. The system of claim 1, wherein said phosphor particles have a time decay characteristic such that said image on said panel has faded to a non-visible condition within a predetermined time after said panel is removed from proximity to said screen. whereby said panel may thereafter be reused to reproduce and display another image displayed on said video screen.

3. The system of claim 1, wherein the emitted radiation is in a wavelength range that is invisible to the eye.

4. The system of claim 1, wherein the emitted radiation defining the display corresponds to a visible colors and regions of the video screen outside the display emit radiations outside said wavelength range corresponding to different colors, said display thereby being difficult to visibly separate from the remainder of the video screen.

5. The system of claim 1 further including an objective lens disposed between said video screen and said image panel, said lens spaced at a distance from said screen so as to focus the emitted radiation from the display upon said phosphor particles exposed to the radiation.

6. The system of claim 5, further including a light baffle disposed between said video screen and said image panel to reduce the exposure of said image panel to extraneous light, and wherein said objective lens is housed by said baffle.

7. The system of claim 5, wherein said objective lens is a positive Fresnel lens.

8. The system of claim 5, wherein said image panel is curved so as to substantially match the curved focal plane created by said objective lens, thereby further improving the sharpness of the image displayed on said panel.

9. The system of claim 1, wherein the emission time of said excited phosphor particles is substantially longer than the excitation time of said phosphor particles.

10. The system of claim 1, wherein said phosphor particles comprise a plurality of phosphor groups, each group having a different but visible emission wavelength when exposed to said emitted radiation to create a multi-colored, light-emitting image of the display on said panel.

11. The system of claim 10, wherein said phosphor particles are selectively placed on said panel so as to produce a multi-colored and multi-patterned image.

12. A system for producing a phosphorescent image excited by an electronically transmitted illumination field, comprising:

a video screen for projecting the illumination field that emits radiation within wavelength range; and an image panel removably placed in close proximity to said video screen in overlapping relation to the illumination field, said image panel including, a substantially transparent, flexible sheet and phosphor particles disposed across said sheet, said particles undergoing phosphorescence in a wavelength range of human-visible light when exposed to the radiation within the wavelength range from said video screen, said image panel being removed from the close proximity to said video screen after having been exposed to the emitted radiation to create a visible light-emitting image of the display on said panel.

13. A system according to 12, wherein said illumination field of said video screen emits radiation of a uniform wavelength across the entire area of said video screen.

14. A method of playing a game using a video screen for projecting an electronically transmitted display which emits radiation within a wavelength range in the area of the screen transmitting the display, and an image panel having a substantially transparent, thin, flexible sheet and phosphor particles disposed uniformly across the sheet, the particles undergoing phosphorescence in a wavelength range of human-visible light when exposed to the radiation within the wavelength range from said video screen, the method comprising the steps of:

placing the image panel in close proximity to the video screen in overlapping relation to the display thereon to activate the phosphor particles exposed to the emitted radiation by the display to phosphoresce; and removing the image panel from the close proximity to the video screen, thereby visibly reproducing the transmitted display for a finite period of time.

15. The method of claim 14, wherein the predetermined display radiating from the video screen is not visible to the human eye.

16. The method of claim 14, further including radiating visible light in regions of the video screen outside the display corresponding to wavelengths to which the phosphor particles are not sensitive, the visible light making it difficult to visibly separate the display from the remainder of the video screen.

17. The method of claim 14, further including focusing the display on the image panel with at least one objective lens.

18. The method of claim 14, further including generating the display.

19. A method of generating a special effects game on a video screen that projects an electronically transmitted display which emits radiation within a wavelength range in the area of the screen transmitting the display, onto an image panel having a substantially transparent, flexible sheet and phosphor particles disposed uniformly across the sheet, the particles undergoing phosphorescence in a wavelength range of human-visible light when placing the image panel in close proximity to the video screen in overlapping relation to the display thereon to activate the phosphor particles exposed to the emitted radiation by the display, the method comprising the steps of:

selecting the wavelength range to generate the phosphor activating display; and radiating the display in a selected area of the video screen.

20. A system for displaying an image of an electronically transmitted display, comprising:

a video screen for projecting the display which emits radiation within a wavelength range in the area of the screen transmitting the display; and an image panel removably placed in close proximity to said video screen in overlapping relation to the display thereon, said image panel including a substantially transparent sheet and phosphor particles disposed uniformly across said sheet, said particles undergoing phosphorescence in a wavelength range of human-visible light when exposed to the radiation within the wavelength range from said video screen, said image panel being removed from the close proximity to said video screen after having been exposed to the emitted radiation to create a visible, light-emitting image of the display on said panel.

21. The system of claim 20, further including an objective lens disposed between said video screen and said image panel, said lens spaced at a distance from said screen so as to focus the emitted radiation from the predetermined display upon said phosphor particles exposed to the radiation.

22. The system of claim 21, further including a light baffle disposed between said video screen and said image panel to reduce the exposure of said image panel to extraneous light, and wherein said objective lens is housed by said baffle.

23. The system of claim 21, wherein said objective lens is a positive Fresnel lens.

24. A method of playing a game using a video screen for projecting an electronically transmitted display which emits radiation within a wavelength range in the area of the screen transmitting the display, and an image panel having a substantially transparent sheet and phosphor particles disposed uniformly across the sheet, the particles undergoing phosphorescence in a wavelength range of human-visible light when exposed to the radiation within the wavelength range from said video screen, the method comprising the steps of:

placing the image panel in close proximity to the video screen in overlapping relation to the display thereon to activate the phosphor particles exposed to the emitted radiation by the display to phosphoresce; and removing the image panel from the close proximity to the video screen, thereby visibly reproducing the transmitted display for a finite period of time.

* * * * *

UNITED STATES PATENT AND TRADEMARK OFFICE
CERTIFICATE OF CORRECTION

PATENT NO. : 6,108,142
DATED : August 22, 2000
INVENTOR(S) : Eric C. Haseltine and Kathleen L. Nelson It is certified that error appears in the above-identified patent and that said Letters Patent are hereby corrected as shown below:

| COL | LINE | DESCRIPTION OF ERROR |
|---|---|---|
| 6 | 39 | Delete the period after "screen" and insert ", " |
| 6 | 45 | Delete "colors" and insert "color," |

Signed and Sealed this

Eighth Day of May, 2001

Attest:

NICHOLAS P. GODICI

Attesting Officer     Acting Director of the United States Patent and Trademark Office